3,097,188
HEAT STABLE POLYMERS

Alvin R. Ingram, Murrysville, Pa., assignor to Koppers Company, Inc., a corporation of Delaware
No Drawing. Filed Sept. 12, 1961, Ser. No. 137,530
4 Claims. (Cl. 260—45.95)

This application relates to stable polymers of styrene and more particularly it relates to heat stable halogenated polymers of styrene.

Conventional polystyrene which includes copolymers of styrene is widely used in a large variety of applications, such as, lighting fixtures, radio and television cabinets, electrical apparatus components and interior automobile components. Conventional polystyrene may also be processed into a foamed form which is useful in a large number of applications wherein conventional or unfoamed polystyrene is not used. These applications include insulation in refrigerators and deep freeze units and fillers for lifebelts and buoys. A relatively new but large outlet for foam polystyrene is the manufacture of insulation board used in building construction. This latter application in particular, as well as many other applications, requires the use of flame retardant or self-extinguishing foams.

One method of rendering the polystyrene flame retardant is to halogenate it. Halogenation processes for polystyrene, both foam and conventional, are well known and have been described in a number of publications, such as for example, United States Patent 2,503,252 and British Patent 778,761. The halogen most generally used is bromine because it is the most effective and is relatively easy to work with. Unfortunately, however, the halogenation treatment generally renders the polystyrene corrosive to steel when the polymer is heated. This is a most serious problem since the polystyrene is most often fabricated by heating it above its softening point and then forming it in an iron or steel mold. Because of the corrosive nature of the halogenated polystyrene the mold, which is often very expensive because of detailed machining required in its construction, is rendered useless quite quickly.

I have now found that I can overcome this problem of corrosiveness and render halogenated polystyrene stable at elevated temperatures by homogeneously compounding the halogenated polystyrene with an alkynol having less than three hydroxy groups.

The alkynols useful in the practice of the invention are those having a boiling point greater than 200° C. and a molecular weight of from 80 to about 600. These alkynols have the structure

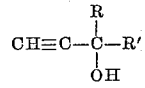

and

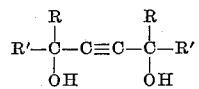

where R and R' are the same or different alkyl, alkenyl, cycloalkyl, cycloalkenyl, aryl, aralkyl, alkylaryl radical and derivatives of these groups. Typical of these alkynols are, for example: 3-phenyl-1-butynol; 3-dimethyloctyndiol; dimethyldodecyndiol; 1-methyl-1-phenylpropargyl alcohol; 2,5-diphenyl-3-hexyne-2,5-diol; 1,2 acetylene-bis-(1-stearol); 1,2 acetylene-bis-(1-cyclopentanol); 1,3,6,8-tetraphenyl-3,6-dihydroxy-4-octyne; 1,2-acetylene-bis-(1-allylisopropylol); 1,3,6,8 - cyclohexyl - p-tolyl-3,6-dihydroxy-4-octyne.

The lower molecular weight, less than about 300, alkynols are generally preferred in the practice of the invention since they are more easily produced. Also, provided they are of a sufficiently low volatility, a smaller quantity is required, based on the total weight of alkynol, per weight of polymer. The alkynols of molecular weight greater than about 600 are most difficult to produce and in addition considerably larger quantities, amounts which are deleterious to the molding procedure, are required in order to obtain an effectively stabilized polymer.

The amount of alkynol needed to stabilize the halogenated polystyrene will vary but in no case will the minimum amount be less than 0.10% by weight of the polystyrene if the polystyrene contains sufficient halogen to render it flame retardant according to ASTM Test Method D–635–44 and the maximum temperature to which the halogenated polymer is to be exposed is not less than 185° C. This temperature 185° C. is also used in the determination of heat stability according to the hereinafter described test. The maximum amount of alkynol needed to insure stability will vary but may be readily determined. The amount depends primarily on the maximum temperature to which the halogenated polymer is to be exposed, the amount and type of halogen contained in the polymer and the particular alkynol used. The higher the temperature of exposure and the more halogen contained in the polymer, the more alkynol required to stabilize it.

To determine the effectiveness as heat stabilizers of various alkynols, the hereinafter described procedure was followed:

A toluene solution of the alkynol and polymer to be tested was prepared. The polymer was made by the polymerization of 32 parts of a solution of previously prepared polystyrene, containing 5% combined bromine, in 68 parts of styrene monomer. Thus, the polymer composition contained 1.6% of combined bromine. The toluene was evaporated and two grams of polymer-alkynol mixture were placed in a four-ounce jar together with a polished steel nail. The jar was covered with aluminum foil and placed in an oven held at 185° C. At the end of two hours, the jar was removed and the corrosion of the nail and the color of the polymer composition were observed according to an arbitrary scale ranging from ineffective to very good.

A series of tests were made according to this procedure using various alkynols. The alkynols used are, as well as the amount used, listed in the table below together with the results obtained.

| Stabilizer | Percent (based on polymer) | Result |
|---|---|---|
| 3-phenyl-1-butynol-3 | 0.75 | Good. |
| 2,5-dimethyl-3-hexyn-2,5-diol | 0.75 | Fair. |
| 2,5-dimethylhexane-2,5-diol | 0.75 | Ineffective. |
| 3,6-dimethyl-4-octyn-3,6-diol | 0.75 | Very Good. |
| 3,6-dimethyloctane-3,6-diol | 0.75 | Ineffective. |
| 4,7-dimethyl-5-decyn-4,7-diol | 0.75 | Very Good. |
| Do | 0.50 | Poor. |
| Do | 0.25 | Ineffective. |
| 5,8-dimethyl-6-dodecyn-5,8-diol | 0.75 | Very Good. |
| Do | 0.50 | Do. |
| Do | 0.25 | Ineffective. |

As a control, a sample of the self-extinguishing polystyrene was tested according to the above procedure and the nail was found to be very corroded. Polystyrene, per se, caused no corrosion by this test.

The alkynols are most conventionally produced by the condensation of acetylene with one or two moles of a ketone. This reaction is well known and is described in Name Reactions in Organic Chemistry, Second Edition, pages 127 and 128, Alexander R. Surrey, Academic Press, Inc., 1954. Many of these alkynols are commercially available by such tradenames as "Surfynol" and "Phenyl-butynol."

In addition to polystyrene, the alkynols are effective in imparting heat stabilization to styrene copolymers which have been rendered self-extinguishing by bromination. Typical of such copolymers are styrene-isoprene and styrene-alpha-methylstyrene.

The foregoing is descriptive of a novel composition for rendering halogenated styrene polymers heat stable without affecting their color thereby permitting the use and fabrication of these compositions in a manner not heretofore possible without undue expense.

I claim:

1. A heat stable flame retardant polystyrene composition comprising polystyrene which has been brominated in an amount sufficient to render it flame retardant, said polystyrene having admixed therewith at least 0.25% by weight of said composition of an alkynol selected from the group consisting of 3-phenyl-1-butynol-3; 3,6-dimethyl-4-octyn-3,6-diol; 4,7-dimethyl-5-decyn-4,7-diol; and 5,8-dimethyl-6-dodecyn-5,8-diol.

2. The composition of claim 1 wherein the alkynol is 3,6-dimethyl-4-octyn-3,6-diol.

3. The composition of claim 1 wherein the alkynol is 4,7-dimethyl-5-decyn-4,7-diol.

4. The composition of claim 1 wherein the alkynol is 5,8-dimethyl-6-dodecyn-5,8-diol.

References Cited in the file of this patent

UNITED STATES PATENTS

| | | |
|---|---|---|
| 2,603,622 | Berger et al. | July 15, 1952 |
| 2,676,940 | Kenyon | Apr. 27, 1954 |
| 2,836,628 | Miller | May 27, 1958 |
| 2,861,052 | Elliot | Nov. 18, 1958 |
| 2,891,036 | Stacy et al. | June 16, 1959 |